United States Patent
Cobley

(10) Patent No.: US 7,818,521 B2
(45) Date of Patent: Oct. 19, 2010

(54) MEMORY MANAGEMENT FOR A MOBILE MULTIMEDIA PROCESSOR

(75) Inventor: Dominic R. Cobley, Cambridgeshire (GB)

(73) Assignee: Broadcom Corporation, Irvine, CA (US)

(*) Notice: Subject to any disclaimer, the term of this patent is extended or adjusted under 35 U.S.C. 154(b) by 43 days.

(21) Appl. No.: 12/136,484

(22) Filed: Jun. 10, 2008

(65) Prior Publication Data

US 2008/0276062 A1    Nov. 6, 2008

Related U.S. Application Data

(63) Continuation of application No. 11/300,388, filed on Dec. 14, 2005, now Pat. No. 7,395,385.

(51) Int. Cl.
*G06F 13/18* (2006.01)
(52) U.S. Cl. .................. 711/158; 711/167; 711/170
(58) Field of Classification Search ............... None
See application file for complete search history.

(56) References Cited

U.S. PATENT DOCUMENTS

| | | | |
|---|---|---|---|
| 6,128,713 A | 10/2000 | Eisler et al. | |
| 6,327,664 B1* | 12/2001 | Dell et al. | 713/323 |
| 6,646,646 B2 | 11/2003 | Peterson et al. | |
| 2001/0021959 A1* | 9/2001 | Holmberg et al. | 711/104 |
| 2005/0021558 A1 | 1/2005 | Beverly et al. | |
| 2005/0033934 A1 | 2/2005 | Paladini et al. | |

FOREIGN PATENT DOCUMENTS

| WO | WO 01/61499 | 8/2001 |
|---|---|---|
| WO | WO 2005/010768 | 2/2005 |

OTHER PUBLICATIONS

European Search Report corresponding to European Patent Application Serial No. 06001731.6-1243, mailed May 27, 2009.
Lidwine, "Dynamic Memory Allocation Optimizes Integration of Blackfin Processor Software." Analog Dialogue, vol. 37, No. 3, Jul. 2003.

* cited by examiner

*Primary Examiner*—Than Nguyen
(74) *Attorney, Agent, or Firm*—McAndrews, Held & Malloy, Ltd.

(57) ABSTRACT

Certain embodiments of the invention may be found in a method for memory management for a mobile multimedia processor. The method may comprise receiving within a mobile multimedia processor chip a plurality of memory requests. The plurality of memory requests may be handled by allocating memory from at least one on-chip memory block and/or at least one off-chip memory block. The memory may be allocated based on a priority level of each of the plurality of memory requests and at least one dynamically settable memory allocation priority threshold. A new dynamically settable memory allocation priority threshold may be dynamically determined based on a new application and/or by monitoring at least one software process in at least one present application. Additionally, new memory request priority level may be dynamically determined for each memory request in at least one software process in a new application.

46 Claims, 6 Drawing Sheets

MEMORY MANAGEMENT FOR A MOBILE MULTIMEDIA PROCESSOR

CROSS-REFERENCE TO RELATED APPLICATIONS/INCORPORATION BY REFERENCE

This is a Continuation Application that makes reference to, claims priority to, and claims benefit of U.S. patent application Ser. No. 11/300,388, filed Dec. 14, 2005. The U.S. patent application Ser. No. 11/300,388 makes reference to, claims priority to, and claims benefit of U.S. Provisional Application Ser. No. 60/652,433 filed Feb. 12, 2005.

This application also makes reference to U.S. application Ser. No. 11/302,930 filed on Dec. 14, 2005.

Each of the above stated application is hereby incorporated herein by reference in its entirety.

FIELD OF THE INVENTION

Certain embodiments of the invention relate to memory usage. More specifically, certain embodiments of the invention relate to a method for memory management for a mobile multimedia processor.

BACKGROUND OF THE INVENTION

Mobile communications have changed the way people communicate and mobile phones have been transformed from a luxury item to an essential part of every day life. The use of mobile phones today is dictated by social situations, rather than hampered by location or technology. While voice connections fulfill the basic need to communicate, and mobile voice connections continue to filter even further into the fabric of every day life, various integrated mobile multimedia applications, utilizing the mobile Internet, may be the next step in the mobile communication revolution.

Third generation (3G) cellular networks offering various high speed access technologies and mobile telephones that have been specifically designed to utilize these technologies, fulfill demands for integrated multimedia applications supporting TV and audio applications utilizing advanced compression standards, high-resolution gaming applications, musical interfaces, peripheral interface support, etc. The processing requirements are being increased as chip designers take advantage of compression and higher bandwidths to transmit more information. 3G wireless applications support bit rates from 384 kilobits (Kbits)/second to 2 megabits (Mbits)/second, allowing chip designers to provide wireless systems with multimedia capabilities, superior quality, reduced interference, and a wider coverage area.

As mobile multimedia services grow in popularity and usage, factors such as power consumption, cost efficient optimization of network capacity and quality of service (QoS) will become even more essential to cellular operators than it is today. These factors may be achieved with careful network planning and operation, improvements in transmission methods, and advances in receiver techniques and chip integration solutions. To this end, carriers need technologies that will allow them to increase downlink throughput for the mobile multimedia applications support and, in turn, offer advanced QoS capabilities and speeds for consumers of mobile multimedia application services. Additionally, the mobile device itself may need to increase its ability to handle the various mobile multimedia applications. One way to do this may be to use more powerful processors. Another way may be to use the memory available in a more efficient manner.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for memory management for a mobile multimedia processor, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method for memory management for a mobile multimedia processor. The method may comprise receiving within a mobile multimedia processor chip, a plurality of memory requests. The plurality of memory requests may be handled by allocating memory from at least one on-chip memory block and/or at least one off-chip memory block. The memory may be allocated based on a priority level of each of the plurality of memory requests and at least one dynamically settable global memory allocation priority threshold. A new dynamically settable global memory allocation priority threshold may be dynamically determined based on a new application and/or by monitoring at least one software process in at least one present application.

Additionally, a new memory request priority level may be dynamically determined for each memory request in at least one software process in a new application. At least one software process in at least one present application may be monitored to dynamically determine a new memory request priority level for at least one memory request. At least one on-chip memory block and at least one off-chip memory block may be specified from which to allocate memory. Data may additionally be moved from the allocated memory to a different memory block. The data may be locked to prevent moving of the data, or it may be unlocked to allow moving of the data.

When unlocked, the data may not be accessible to other processes except to move the data.

Various aspects of the invention may provide support for allocating faster on-chip memory, versus slower off-chip memory, to memory requests that may be deemed important, and hence have higher priority levels. An algorithm used for allocating memory may be based on various factors, such as, for example, size of memory requested, whether cache may be used, whether DMA may be used, and the number of times the memory may be expected to be accessed per unit time.

Figure 1A:
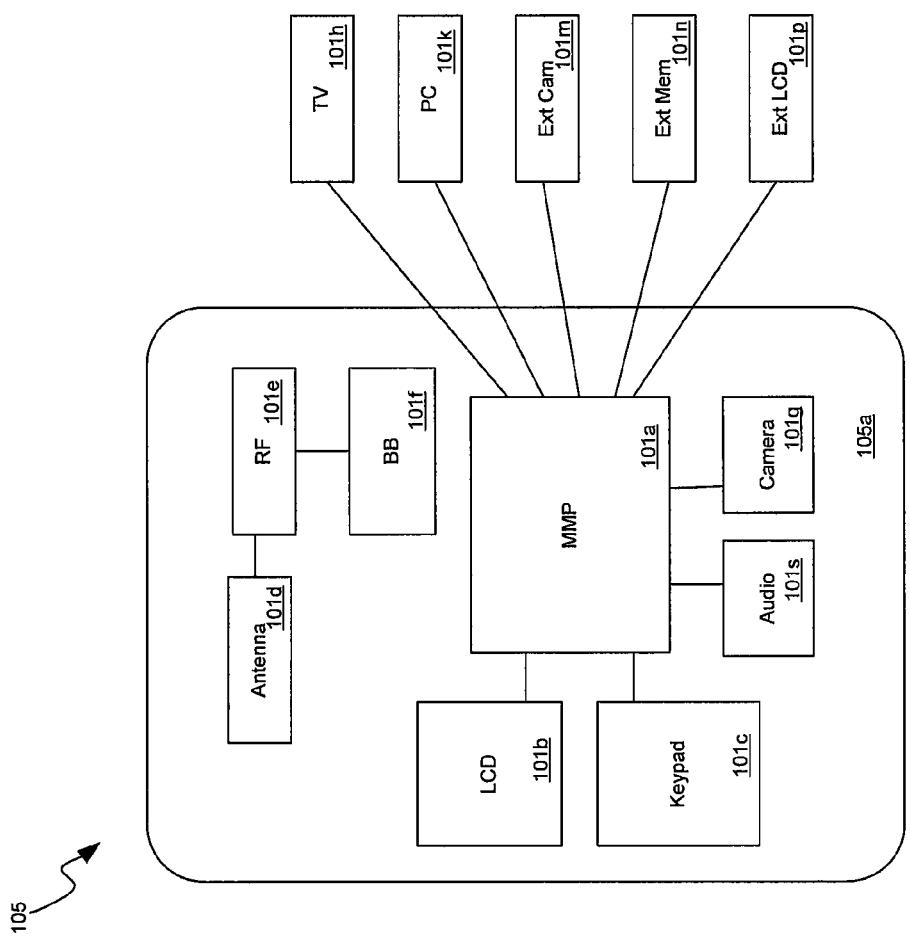
FIG. 1a is a block diagram of an exemplary mobile multimedia system, in accordance with an embodiment of the invention.

FIG. 1a is a block diagram of an exemplary mobile multimedia system, in accordance with an embodiment of the invention. Referring to FIG. 1a, there is shown a mobile multimedia system 105 that comprises a mobile multimedia device 105a, a TV 101h, a PC 101k, an external camera 101m, external memory 101n, and external LCD display 101p. The mobile multimedia device 105a may be a cellular telephone or other handheld communication or data processing device. The mobile multimedia device 105a may comprise a mobile multimedia processor (MMP) 101a, an antenna 101d, an audio block 101s, a radio frequency (RF) block 101e, a baseband processing block 101f, an LCD display 101b, a keypad 101c, and a camera 101g.

The MMP 101a may comprise suitable circuitry, logic, and/or code and may be adapted to perform video and/or multimedia processing for the mobile multimedia device 105a. The MMP 101a may further comprise a plurality of integrated interfaces, which may be utilized to support one or more external devices coupled to the mobile multimedia device 105a. For example, the MMP 101a may support connections to a TV 101h, a PC 101k, an external camera 101m, external memory 101n, and an external LCD display 101p.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video signals may also be received via the integrated camera 101g, the TV 101h, the PC 101k, and/or the external camera 101m. During processing, the MMP 101a may utilize the external memory 101n for storing of processed data. Processed audio data may be communicated to the audio block 101s and processed video data may be communicated to the LCD 101b or the external LCD 101p, for example. The keypad 101c may be utilized for communicating processing commands and/or other data, which may be required for audio or video data processing by the MMP 101a.

Figure 1B:
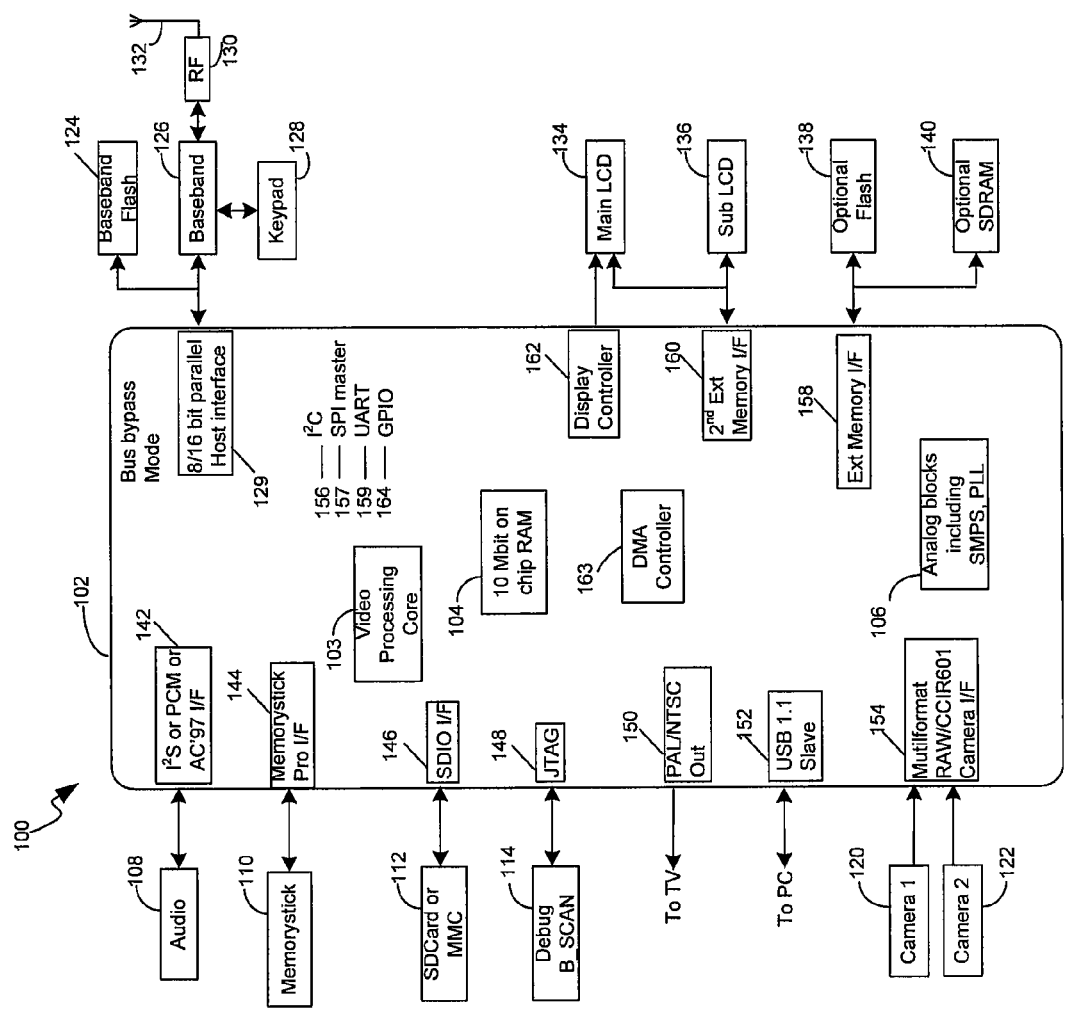
FIG. 1b is a block diagram of an exemplary mobile multimedia processor, in accordance with an embodiment of the invention.

FIG. 1b is a block diagram of an exemplary mobile multimedia processor, in accordance with an embodiment of the invention. Referring to FIG. 1b, the mobile multimedia processor 102 may comprise suitable logic, circuitry and/or code that may be adapted to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103, RAM 104, an analog block 106, a direct memory access (DMA) controller 163, an audio interface (I/F) 142, a memory stick I/F 144, SD card I/F 146, JTAG I/F 148, TV output I/F 150, USB I/F 152, a camera I/F 154, a host I/F 129, and an integrated-integrated circuit ($I^2C$) I/F 156. The mobile multimedia processor 102 may further comprise a serial peripheral interface (SPI) 157, a universal asynchronous receiver/transmitter (UART) I/F 159, general purpose input/output (GPIO) pins 164, a display controller 162, an external memory I/F 158, and a second external memory I/F 160.

The video processing core 103 may comprise suitable circuitry, logic, and/or code and may be adapted to perform video processing of data. The RAM 104 may comprise suitable logic, circuitry and/or code that may be adapted to store on-chip data such as video data. In an exemplary embodiment of the invention, the RAM 104 may be adapted to store 10 Mbits of on-chip data, for example. The size of the on-chip RAM 104 may vary depending on cost or other factors such as chip size.

The analog block 106 may comprise a switch mode power supply (SMPS) block and a phase locked loop (PLL) block. In addition, the analog block 106 may comprise an on-chip SMPS controller, which may be adapted to generate its core voltage. The core voltage may be software programmable according to, for example, speed demands on the mobile multimedia processor 102, allowing further control of power management.

In an exemplary embodiment of the invention, the normal core operating range may be about 0.8 V-1.2 V and may be reduced to about 0.6 V during hibernate mode. The analog block 106 may also comprise a plurality of PLL's that may be adapted to generate about 195 kHz-200 MHz clocks, for example, for external devices. Other voltages and clock speeds may be utilized depending on the type of application. An application may, for example, play MP3 files or play video files. The mobile multimedia processor 102 may comprise a plurality of power modes of operation, for example, run, sleep, hibernate and power down. In accordance with an embodiment of the invention, the mobile multimedia processor 102 may comprise a bypass mode that may allow a host to access memory mapped peripherals in power down mode, for example. In bypass mode, the mobile multimedia processor 102 may be adapted to directly control the display during normal operation while giving a host the ability to maintain the display during standby mode.

The audio block 108 may comprise suitable logic, circuitry and/or code that may be adapted to communicate with the mobile multimedia processor 102 via an inter-IC sound ($I^2S$), pulse code modulation (PCM) or audio codec (AC'97) interface 142 or other suitable interface, for example. In the case of an AC'97 and/or an $I^2S$ interface, suitable audio controller, processor and/or circuitry may be adapted to provide AC'97 and/or $I^2S$ audio output respectively, in either master or slave mode. In the case of the PCM interface, a suitable audio controller, processor and/or circuitry may be adapted to allow input and output of telephony or high quality stereo audio. The PCM audio controller, processor and/or circuitry may comprise independent transmit and receive first in first out (FIFO) buffers and may use DMA to further reduce processor overhead. The audio block 108 may also comprise an audio in, audio out port and a speaker/microphone port (not illustrated in FIG. 1b).

The mobile multimedia device 100 may comprise at least one portable memory input/output (I/O) block. In this regard, the memorystick block 110 may comprise suitable logic, circuitry and/or code that may be adapted to communicate with the mobile multimedia processor 102 via a memorystick pro interface 144, for example. The SD card block 112 may comprise suitable logic, circuitry and/or code that may be adapted to communicate with the mobile multimedia processor 102 via a SD input/output (I/O) interface 146, for example. A multimedia card (MMC) may also be utilized to communicate with the mobile multimedia processor 102 via the SD input/output (I/O) interface 146, for example. The mobile multimedia device 100 may comprise other portable memory I/O blocks such an xD I/O card.

The debug block 114 may comprise suitable logic, circuitry and/or code that may be adapted to communicate with the mobile multimedia processor 102 via a joint test action group (JTAG) interface 148, for example. The debug block 114 may be adapted to access the address space of the mobile multimedia processor 102 and may be adapted to perform boundary scan via an emulation interface. Other test access ports (TAPs) may be utilized. The phase alternate line (PAL)/national television standards committee (NTSC) TV output I/F 150 may be utilized for communication with a TV, and the universal serial bus (USB) 1.1, or other variant thereof, slave port I/F 152 may be utilized for communications with a PC, for example. The cameras 120 and/or 122 may comprise suitable logic, circuitry and/or code that may be adapted to communicate with the mobile multimedia processor 102 via a multi-format raw CCIR 601 camera interface 154, for example. The camera I/F 154 may utilize windowing and sub-sampling functions, for example, to connect the mobile multimedia processor 102 to a mobile TV front end.

The mobile multimedia processor 102 may also comprise a plurality of serial interfaces, such as the USB I/F 152, an inter-integrated circuit ($I^2C$) master I/F 156, a serial peripheral interface (SPI) 157, and a universal asynchronous receiver/transmitter (UART) I/F 159 for Bluetooth or IrDA. The $I^2C$ master interface 156 may comprise suitable circuitry, logic, and/or code and may be adapted to control image sensors and may be a connected to smart batteries and other peripherals. The SPI master interface 157 may comprise suitable circuitry, logic, and/or code and may be utilized to control image sensors. Two chip selects may be provided, for example, to work in a polled mode with interrupts or via a DMA controller 163. Furthermore, the mobile multimedia processor 102 may comprise a plurality of general purpose I/O (GPIO) pins 164, which may be utilized for user defined I/O or to connect to the internal peripherals. The display controller 162 may comprise suitable circuitry, logic, and/or code and may be adapted to support multiple displays with XGA resolution, for example, and to handle 8/9/16/18/21-bit video data.

The baseband flash memory 124 may be adapted to receive data from the mobile multimedia processor 102 via an 8/16 bit parallel host interface 129, for example. The host interface 129 may be adapted to provide two channels with independent address and data registers through which a host processor may read and/or write directly to the memory space of the mobile multimedia processor 102. The baseband processing block 126 may comprise suitable logic, circuitry and/or code that may be adapted to convert RF signals to baseband and communicate the baseband processed signals to the mobile multimedia processor 102 via the host interface 129, for example. The RF processing block 130 may comprise suitable logic, circuitry and/or code that may be adapted to receive signals via the antenna 132 and to communicate RF signals to the baseband processing block 126. The host interface 129 may comprise a dual software channel with a power efficient bypass mode.

The main LCD 134 may be adapted to receive data from the mobile multimedia processor 102 via a display controller 162 and/or from a second external memory interface 160, for example. The display controller 162 may comprise suitable logic, circuitry and/or code and may be adapted to drive an internal TV out function or be connected to a range of LCD's. The display controller 162 may be adapted to support a range of screen buffer formats and may utilize direct memory access (DMA) to access the buffer directly and increase video processing efficiency of the video processing core 103. Both NTSC and PAL raster formats may be generated by the display controller 162 for driving the TV out. Other formats, for example SECAM, may also be supported In one embodiment of the invention, the display controller 162 may be adapted to support a plurality of displays, such as an interlaced display, for example a TV, and/or a non-interlaced display, such as an LCD. The display controller 162 may also recognize and communicate a display type to the DMA controller 163. In this regard, the DMA controller 163 may fetch video data in an interlaced or non-interlaced fashion for communication to an interlaced or non-interlaced display coupled to the mobile multimedia processor 102 via the display controller 162.

The substitute LCD 136 may comprise suitable logic, circuitry and/or code that may be adapted to communicate with the mobile multimedia processor 102 via a second external memory interface, for example. The mobile multimedia processor 102 may comprise a RGB external data bus. The mobile multimedia processor 102 may be adapted to scale image output with pixel level interpolation and a configurable refresh rate.

The optional flash memory 138 may comprise suitable logic, circuitry and/or code that may be adapted to communicate with the mobile multimedia processor 102 via an external memory interface 158, for example. The optional SDRAM 140 may comprise suitable logic, circuitry and/or code that may be adapted to receive data from the mobile multimedia processor 102 via the external memory interface 158, for example. The external memory I/F 158 may be utilized by the mobile multimedia processor 102 to connect to external SDRAM 140, SRAM, Flash memory 138, and/or external peripherals, for example. Control and timing information for the SDRAM 140 and other asynchronous devices may be configurable by the mobile multimedia processor 102.

The mobile multimedia processor 102 may further comprise a secondary memory interface 160 to connect to connect to memory-mapped LCD and external peripherals, for example. The secondary memory interface 160 may comprise suitable circuitry, logic, and/or code and may be utilized to connect the mobile multimedia processor 102 to slower devices without compromising the speed of external memory access. The secondary memory interface 160 may provide 16 data lines, for example, 6 chip select/address lines, and programmable bus timing for setup, access and hold times, for example. The mobile multimedia processor 102 may be adapted to provide support for NAND/NOR Flash including NAND boot and high speed direct memory access (DMA), for example.

In operation, the mobile multimedia processor 102 may be adapted to support multiple display formats for displaying processed video data. For example, interlaced and/or non-interlaced external displays may be connected to the mobile multimedia processor 102 via the display controller 162. The display controller 162 may communicate the external display type to the DMA controller 163. The DMA controller 163 may then access the on-chip RAM 104 and may fetch processed video data in an interlaced or non-interlaced format, corresponding to the external display type. As part of normal operation of the mobile multimedia system 105 (FIG. 1*a*), there may be run-time allocation and deallocation of memory for various software processes that may be executed by, for example, the mobile multimedia processor 102.

Figure 2:
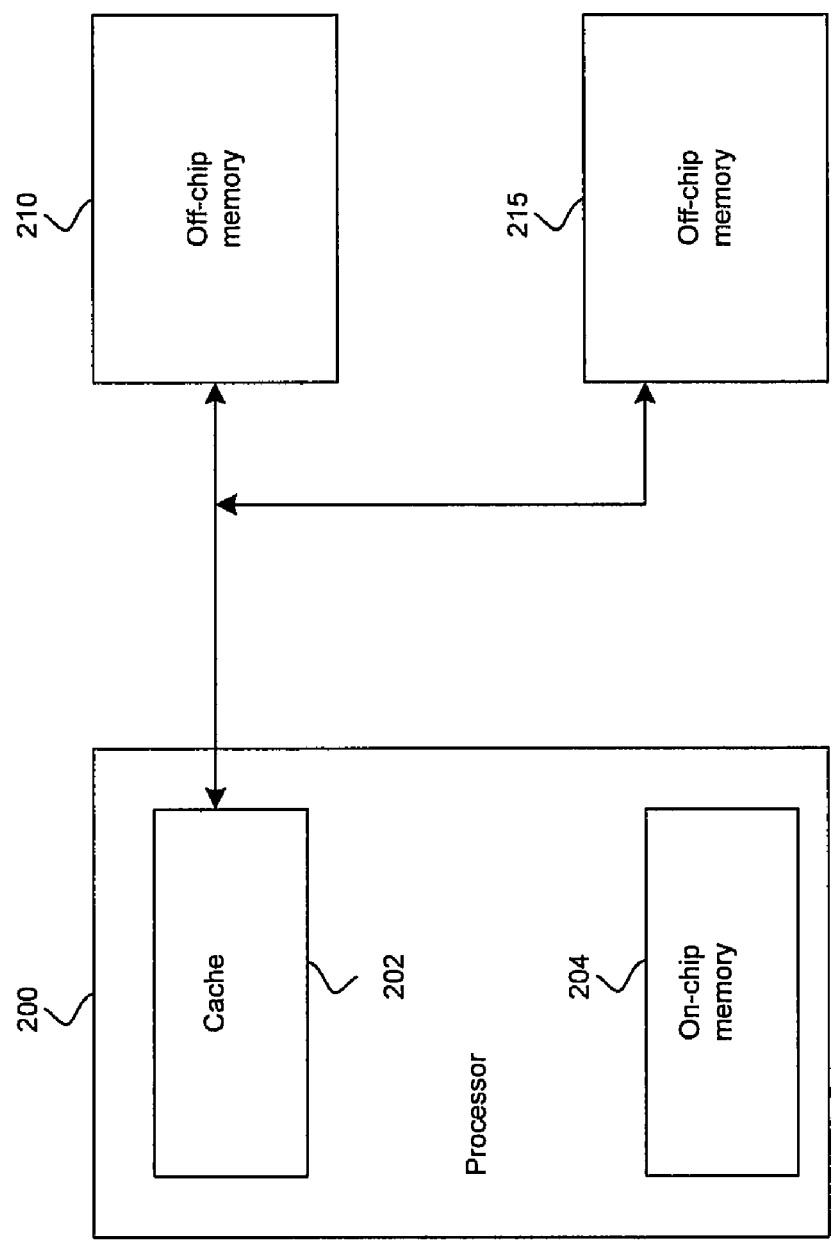
FIG. 2 is a block diagram illustrating exemplary memory available to a processor, in accordance with an embodiment of the invention.

FIG. 2 is a block diagram illustrating exemplary memory available to a processor, in accordance with an embodiment of the invention. Referring to FIG. 2, there is shown a processor block 200, and off-chip memory blocks 210 and 215.

The processor block 200 may be, for example, the mobile multimedia processor 102 described with respect to FIG. 1b. The processor block 200 may comprise cache block 202 and on-chip memory block 204. The cache block 202 may comprise logic, circuitry, and/or code that may be adapted to predict the address range of information in the off-chip memory blocks 210 and 215 that may be needed next. The cache block 202 may read the information from the predicted address range and store that information on-chip in the cache block 202. This may save access time for the information needed since accessing the information in the cache block 202 may be faster than accessing the information in the off-chip memory blocks 210 and/or 215.

The on-chip memory block 204 may comprise logic and/or circuitry that may be adapted to store information, for example, data and/or instructions, and also provide the stored information upon a read request. The on-chip memory block 204 may comprise a single type of memory, for example, dynamic random access memory (DRAM), static random access memory (SRAM) or read only memory (ROM). The on-chip memory block 204 may also comprise various types of memory where each memory type may have its own address range and may be accessed independently of the other memory types. Physically, the various types of memory, or even various sections of the same type of memory, may be in different physical locations on the chip. For the purposes of this application, when referring to the exemplary on-chip memory block 204, the type of memory referred to may be those types of memory that are readable and writeable, for example, DRAM or SRAM. The off-chip memory blocks 210 and 215 may be logic and/or circuitry that may be adapted to store information, for example, data and/or instructions, and also provide stored information upon a read request. For example, the off-chip memory blocks 210 and 215 may be DRAM and/or SRAM.

In operation, the processor block 200 may load information, such as, for example, static data and instructions, to memory that offers fastest access time. The fastest access time may be an average access time. The access time may be dependent on the physical characteristics of the memory, for example, the location of the memory, and the read and/or write times. The access time may also be dependent on whether a caching system is used. In this regard, some information may be stored in the on-chip memory block 204, which may have a fast access time. Other information may be stored in the off-chip memory blocks 210 and/or 215 that may have slower access time than the on-chip memory block 204. However, the information in the off-chip memory blocks 210 and 215 may be accessed via the cache block 202 that may try to predict the blocks of information needed next, and prefetch those blocks of information.

Software processes that request memory during run-time may be allocated memory from either the on-chip memory block 204 or the off-chip memory block 210 and/or 215. However, in some cases, the cache may be thrashed repeatedly by reading in unneeded information. For example, this may happen if the information required is offset by an address range bigger than the number of bytes the cache reads at one time, or if recently discarded cache information is needed from the off-chip memory blocks. This thrashing by the cache may reduce the effectiveness of a caching system, and in extreme cases may even degrade performance further than if the caching system was not used. Although the off-chip memory may be described as being two blocks, for example, the off-chip memory blocks 210 and 215, the invention need not be so limited. The number of off-chip memory blocks may be other than two blocks.

Figure 3:
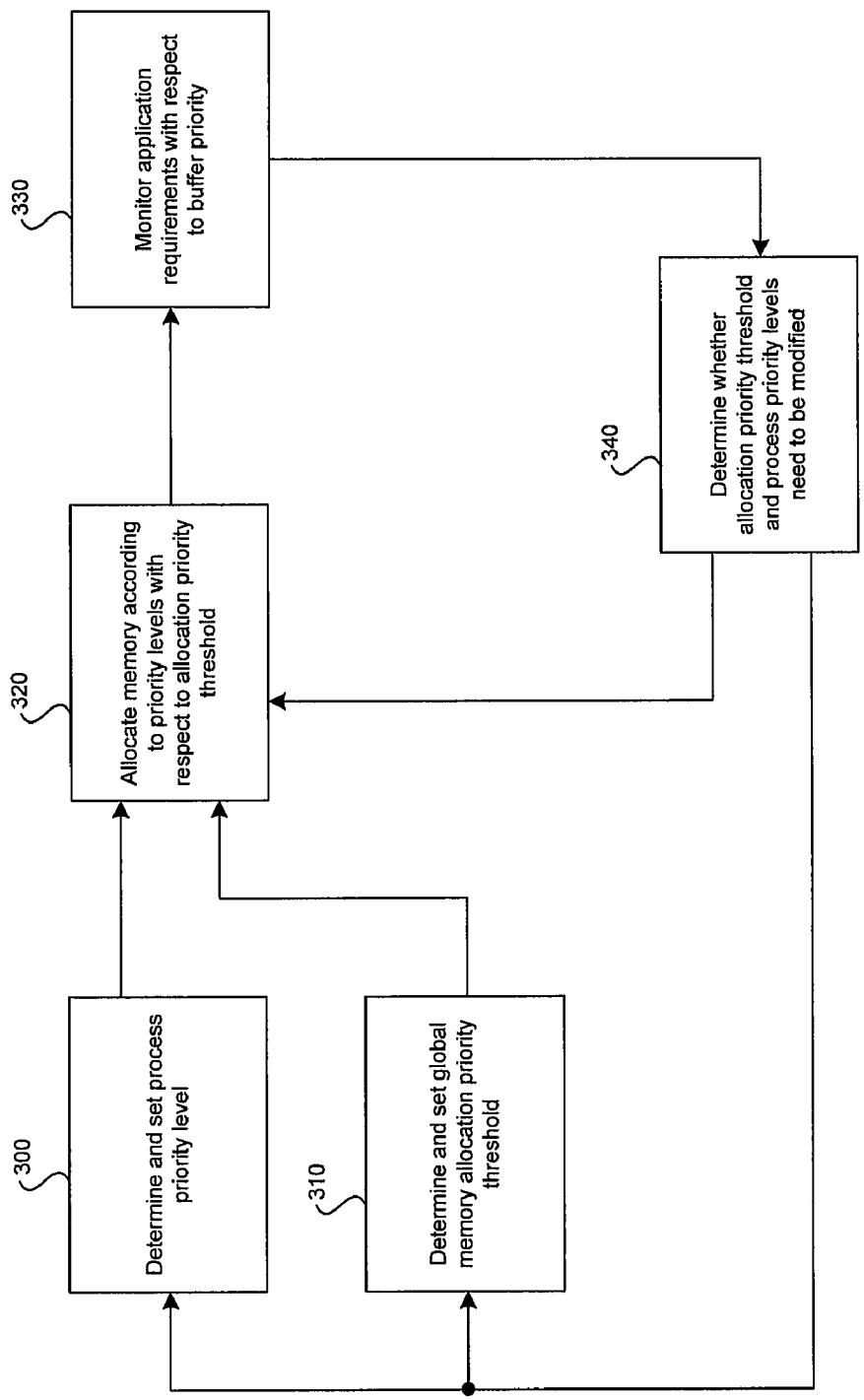
FIG. 3 is a flow diagram illustrating exemplary memory allocation using priority for each software process, in accordance with an embodiment of the invention.

FIG. 3 is a flow diagram illustrating exemplary priority memory allocation, in accordance with an embodiment of the invention. Referring to FIG. 3, in step 300, a priority level may be determined and set for each process's run-time request for memory. In step 310, a global memory allocation priority threshold may be determined and set. In step 320, the run-time request for memory may be granted according to an algorithm in place for comparing a memory request priority level with a global memory allocation priority threshold. In step 330, conditions that may require changes to the global memory allocation priority threshold and/or the memory request priority levels may be monitored. In step 340, the conditions monitored in step 330 may be utilized to change the existing global memory allocation priority threshold and/ or the memory request priority levels.

Referring to FIG. 3, the steps 300 to 340 may be utilized for run-time memory allocation. In step 300, the priority level for each memory request may be determined and assigned to the memory request dynamically. For example, an embodiment of the invention may assign a priority level to a memory request that may be proportional to the expected number of accesses to the requested buffer in one second. For applications where the entire requested memory buffer may be accessed serially, such as, for example, a video buffer, an embodiment of the invention may set the priority level to the total number of times the entire buffer is read or written per unit time, for example, a second. The total number of times the entire buffer is read or written per unit time may be determined empirically via test routines, simulation, or other analysis of the system. Another embodiment may utilize an algorithm where the priority level may be proportional to the number of bytes accessed in the buffer per unit time, for example, a second.

In step 310, a global memory allocation priority threshold may be determined and set dynamically. For example, an embodiment of the invention may use an algorithm to set the global memory allocation priority threshold that may allow a maximum number of memory buffers that may be requested for a specific application that may be executed. For example, there may be 100 kilobytes (KB) of on-chip memory, for example, the on-chip memory block 204 (FIG. 2). There may also be eight expected memory allocation requests, and four of those expected memory allocation requests may be for memory buffers size of 20 KB each, and with priority levels of 600, 300, 200 and 150. The other four memory requests may be for memory buffers of 30 KB, 35 KB, 115 KB and 125 KBs, with each having a priority level of 60.

The maximum number of memory buffers that can be allocated to the 100 KB on-chip memory block 204 may be four memory buffers, each of size 20 KB. Therefore, in order to ensure that the memory allocation requests for those four memory buffers may be allocated to the on-chip memory block 204, the global memory allocation priority threshold may be set to 100. Accordingly, only the memory allocation requests for the 20 KB memory buffers may be allocated from the on-chip memory block 204 since their priority levels are above 100. The other four memory requests for memory buffer sizes of 30 KB, 35 KB, 115 KB and 125 KB may not be allocated from the on-chip memory block 204 since their priority levels are below 100. In another example, the size of the on-chip memory block 204 may be 50 KB. In order to maximize the number of high priority memory allocation requests, the global memory allocation priority threshold may be set to 250. Accordingly, this may allow the two highest priority memory requests, for example, the memory requests with priority levels of 600 and 300, to be allocated memory space on the on-chip memory block 204.

Another example may comprise instances where all memory buffers requested for applications that are running are capable of being allocated from the on-chip memory block 204. By allocating memory from the on-chip memory block 204, the off-chip memory blocks 210 and 215 (FIG. 2) may not need to be used. Accordingly, the off-chip memory blocks 210 and 215 may be able to be placed in a stand-by mode, and power may be conserved. However, memory buffers for a particular purpose for an application that may be allocated from the on-chip memory block 204 may not be allocated from the on-chip memory for the same purpose in another application. For example, it may be advantageous for an application that only plays MP3 files to have all the memory buffers be on-chip in order not to conserve power by not using the off-chip memory. However, a video application may find it more advantageous to have memory buffers that are related to rendering the video be on-chip while the memory buffers that are related to audio, including processing MP3 files, be off-chip.

In step 320, memory buffers may be allocated either in the on-chip memory block 204 or in the off-chip memory blocks 210 and/or 215, based on the priority level of the memory allocation request and the global memory allocation priority threshold. For example, if the global memory allocation priority threshold is set to 300, then memory allocation requests with priority levels greater than 300 may be allocated memory from the on-chip memory block 204. Similarly, those memory allocation requests with priority levels less than 300 may be allocated memory from the off-chip memory blocks 210 and/or 215. Whether the memory allocation requests with priority levels that are equal to the global memory allocation priority threshold may be allocated memory from the on-chip memory block 204 or the off-chip memory blocks 210 and/or 215, may be a design and/or implementation decision.

In step 330, the application or applications that are running or are scheduled to run may be monitored with regard to how the allocation of memory buffers may be affected. For example, an application that is running presently may be a video rendering application, and a frame rate of the video may be changed. Accordingly, since the frame rate may be directly related to the number of accesses to the video buffers, the allocation scheme of the memory buffers may need to be changed. This may be accomplished by adjusting the global memory priority threshold and/or the memory allocation request priority levels.

In step 340, changes to priority levels of memory requests and/or global memory allocation priority threshold may be made based on the determination made in step 330. In an embodiment of the invention, changes to the memory request priority levels and/or global memory allocation priority threshold may require release of allocated memory. The memory requests may occur again using the new memory request priority levels and/or global memory allocation priority threshold. In another embodiment of the invention, allocated memory may not be released, but future allocation of memory may be based on the new memory request priority levels and/or global memory allocation priority threshold. The decision to release already allocated memory may depend on whether a new application is to be executed, or whether changes may have been detected in the present application that is running, or other design considerations.

Although an embodiment of the invention may have been described using a simple algorithm above, the invention need not be so limited. An embodiment of the invention may utilize an algorithm that considers various factors, where the factors may or may not be weighted. Some examples of the factors that may be considered may be how often the memory buffer is accessed and whether the access to the memory buffer is by direct memory access (DMA). Since DMA operations may take place when the processor, for example, the mobile multimedia processor 102 (FIG. 1b) is not using the memory, there may be fewer stalls. A stall may occur in instances where the processor needs to wait for data to be accessed from off-chip memory.

In instances where access to the memory buffer occurs via a cache memory, for example, the cache block 202 (FIG. 2), there may be fewer stalls. However, this may depend on the manner in which information is being accessed. For example, if the accesses to the memory buffer occur randomly, the cache may not reduce the number of stalls by much, if at all. Conversely, a small amount of data that is accessed many times may tend to remain in the cache, and therefore may show good performance. Another factor may be the size of the requested memory. Allocating a large memory buffer from the on-chip memory block may require other memory buffers to be allocated from off-chip memory block. If there are more memory accesses from the off-chip memory buffers than from the large on-chip memory buffer, the number of stalls may be unacceptable. In one embodiment of the invention, the priority level of a memory request may be set so that it is proportional to the number of expected stalls.

Additionally, in the embodiment of the invention where two memory blocks are utilized, one threshold may be utilized for the two blocks of memory. However, the invention need not be limited in that manner. For example, there may be a plurality of blocks of memory, and each of the memory blocks may possess a different access time. Accordingly, there may be a plurality of thresholds that may be used to determine allocation of memory from at least one block of memory. For example, there may be four blocks of memory A, B, C, and D, and the access times may increase from memory block A to memory block D. Accordingly, there may be global memory allocation priority thresholds for allocation between memory blocks A and B, for allocation between memory blocks B and C, and for allocation between memory blocks C and D.

A block of memory may be a logical or physical grouping of memory. A logical block of memory may comprise memory that have similar access times but may or may not be in different physical locations. Although both the memory request priority levels and the global memory allocation priority threshold may be changed, it may be easier to only change the global memory allocation priority thresholds. This may occur because it may be easier to change the relatively fewer global memory allocation priority thresholds than a larger number of memory request priority levels. However, changing the memory request priority levels may, at times, give additional control over memory allocation.

An embodiment of the invention may also be able to force a specific memory buffer to a specific memory block, for example, to an on-chip memory block, regardless of the priority level of the memory request. One way to accomplish this is to use a different memory request function that specifies the memory block from which memory buffer space is to be allocated. Alternatively, there may be a separate memory request function that may be used to request memory buffer space from each of the different memory blocks.

An embodiment of the invention may determine that the memory buffer may have too many stalls by monitoring the memory buffer performance. The memory buffer may be moved to a memory block that may reduce the number of stalls. Accordingly, it may be necessary to have memory buffers in a locked state when normally accessed, and in an unlocked state when being moved. The contents of a memory buffer in an unlocked state may not be accessed by applications in order to keep the integrity of the contents of the memory buffer as it is being moved to a different memory block. Once the move is completed, the memory buffer may be locked.

Figure 4:
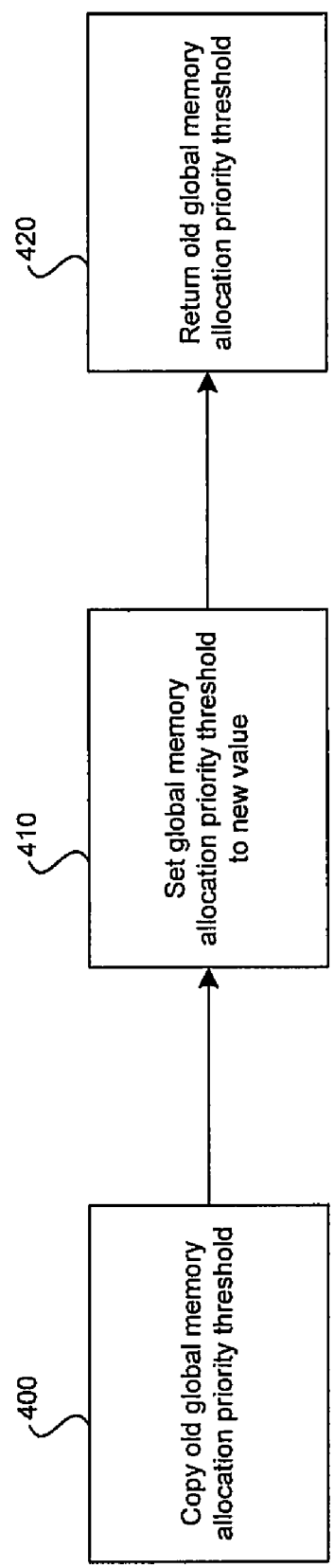
FIG. 4 is a flow diagram illustrating exemplary routine for setting global memory allocation priority threshold, in accordance with an embodiment of the invention.

FIG. 4 is a flow diagram illustrating exemplary routine for setting global memory allocation priority threshold, in accordance with an embodiment of the invention. Referring to FIG. 4, in step 400 the global memory allocation priority threshold value that is currently used may be copied to a variable. In step 410, the global memory allocation priority threshold value may be changed to the value that was passed in by a calling function. In step 420, the old global memory allocation priority threshold value may be returned to the routine that called the present routine.

Referring to FIG. 4, there is shown steps 400 to 420 that may be utilized by a software or firmware routine to change the global memory allocation priority threshold. In step 400, the old global memory allocation priority threshold value may be stored in a variable to save the old value when the global memory allocation priority threshold value is changed. In step 410, the global memory allocation priority threshold value may be changed to a new value that may be passed in as a parameter when this routine was called. This new value may be utilized for all subsequent memory allocations in order to locate a memory buffer that is deemed important for an application that is running in the on-chip memory. In step 420, the routine may finish by returning the old global memory allocation priority threshold value that was saved in step 410.

Figure 5:
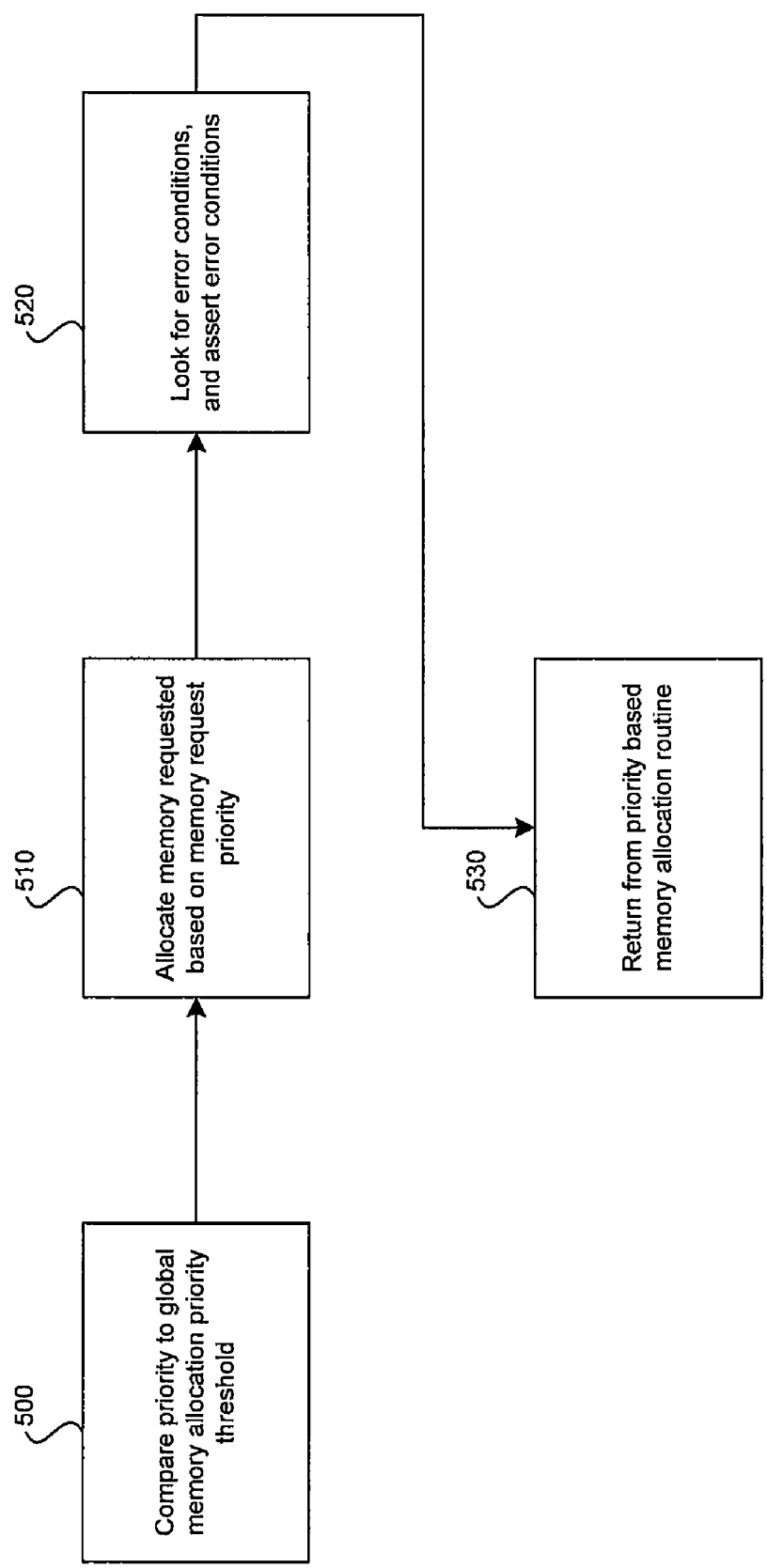
FIG. 5 is a flow diagram illustrating exemplary routine for priority based memory request, in accordance with an embodiment of the invention.

FIG. 5 is a flow diagram illustrating exemplary routine for priority based memory request, in accordance with an embodiment of the invention. Referring to FIG. 5, in step 500 the priority level that may have been passed in as a parameter by a calling function may be compared to the global memory allocation priority threshold value. In step 510, the result of the comparison in step 500 may be utilized to allocate memory in either on-chip memory or off-chip memory. In step 520, error conditions may be checked and any resulting error results may be asserted. In step 530, this routine may finish by returning to the calling routine with a return value that may indicate whether the priority level based memory request was successfully completed or not.

Referring to FIG. 5, steps 500 to 530 that may be utilized by a software or firmware priority based memory request routine to allocate memory based on the priority level of the memory request. In step 500, the priority based memory request routine may have various parameters, such as, for example, the size of the requested memory, the byte alignment boundary, priority level for the requested memory, and a description for the requested memory. This priority based memory request routine may compare the passed in or input priority parameter to the global memory allocation priority threshold value. If the passed in or input priority is less than the global memory allocation priority threshold value, then off-chip memory may be allocated for the requested memory buffer. If the passed in or input priority level is equal to or greater than the global memory allocation priority threshold value, then on-chip memory may be allocated for the requested memory buffer.

In step 510, a memory allocation routine may be called to allocate memory, and the parameters passed to the memory allocation routine may include the size of the requested memory, for example, in bytes, and the alignment boundary of the memory requested. For example, the alignment boundary may be a two-byte boundary, four-byte boundary or eight-byte boundary. Other byte boundary values may also be utilized. Another parameter that may be utilized when calling the memory allocation routine may be a parameter that indicates whether the memory to be allocated may be the on-chip memory, for example, the on-chip memory block 204 (FIG. 2), or the off-chip memory, for example, the off-chip memory block 210 or 215 (FIG. 2). Another parameter that may be utilized by the memory allocation routine may be a description parameter. The description parameter may be a string of characters that may describe the memory buffer, such as, for example, what it is to be used for. The memory allocation routine may return a return value that may indicate successful allocation of memory or unsuccessful allocation of memory. The memory allocation routine return value may be saved in a variable.

In step 520, error checking may occur. For example, if the passed in priority parameter is not part of the priority values that may be utilized for on-chip memory or off-chip memory, or if the called memory allocation routine returned an error condition, then error indications may be asserted. In step 530, the priority based memory request routine may return to the calling routine with a return value that may be the memory allocation routine return value that was saved in step 510.

Although an embodiment of the invention may have been described as allocating off-chip memory, or slower memory, if the memory request priority level is less than the global memory allocation priority threshold, the invention need not be so limited. A determination of whether to allocate faster or slower memory based on comparing the memory request priority level with the global memory allocation priority threshold may be design and/or implementation dependent.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A method for managing memory, the method comprising:
   receiving within a mobile multimedia processor chip a plurality of memory requests;
   handling said plurality of memory requests by allocating memory from one or both of: at least one on-chip memory block and/or at least one off-chip memory block; and
   said allocating memory based on the priority level for each of said plurality of memory requests and at least one dynamically settable memory allocation priority threshold; and
   setting said priority level based on a total number of memory buffers requested.

2. The method according to claim 1, comprising setting said priority level based on an expected number of memory accesses.

3. The method according to claim 1, comprising setting said priority level based on a total number of memory accesses per unit time.

4. The method according to claim 1, comprising placing said off-chip memory block in a power-saving mode.

5. The method according to claim 1, comprising dynamically determining a new said at least one dynamically settable memory allocation priority threshold by monitoring at least one software process in at least one present application.

6. The method according to claim 5, wherein said monitoring determines a change in a processing data rate for said present application.

7. The method according to claim 6, wherein said change in said processing data rate comprises a change in a video frame rate.

8. The method according to claim 6, wherein said data comprises video data.

9. The method according to claim 6, wherein said data comprises audio data.

10. A machine-readable storage having stored thereon, a computer program having at least one code section for managing memory, the at least one code section being executable by a machine for causing the machine to perform steps comprising:
    receiving within a mobile multimedia processor chip a plurality of memory requests;
    handling said plurality of memory requests by allocating memory from one or both of: at least one on-chip memory block and/or at least one off-chip memory block; and
    said allocating memory based on the priority level for each of said plurality of memory requests and at least one dynamically settable memory allocation priority threshold; and
    setting said priority level based on a total number of memory buffers requested.

11. The machine-readable storage according to claim 10, wherein the at least one code section comprises code for setting said priority level based on an expected number of memory accesses.

12. The machine-readable storage according to claim 10, wherein the at least one code section comprises code for setting said priority level based on a total number of memory accesses per unit time.

13. The machine-readable storage according to claim 10, wherein the at least one code section comprises code for placing said off-chip memory block in a power-saving mode.

14. The machine-readable storage according to claim 10, wherein said monitoring determines a change in a processing data rate for at least one present application.

15. The machine-readable storage according to claim 14, wherein said change in said processing data rate comprises a change in a video frame rate.

16. The machine-readable storage according to claim 14, wherein said data comprises video data.

17. The machine-readable storage according to claim 14, wherein said data comprises audio data.

18. A system for managing memory, the system comprising:
    one or more circuits operable within a mobile multimedia processor chip for receiving a plurality of memory requests; and
    said one or more circuits operable for handling said plurality of memory requests by allocating memory from one or both of: at least one on-chip memory block and at least one off-chip memory block, wherein said allocating memory is based on a priority level of each of said plurality of memory requests and at least one dynamically settable memory allocation priority threshold; and
    said one or more circuits are operable for setting said priority level based on a total number of memory buffers requested.

19. The system according to claim 18, wherein said one or more circuits are operable for setting said priority level based on an expected number of memory accesses.

20. The system according to claim 18, wherein said one or more circuits are operable for setting said priority level based on a total number of memory accesses per unit time.

21. The system according to claim 18, wherein said one or more circuits are operable for placing said off-chip memory block in a power-saving mode.

22. The system according to claim 18, wherein said one or more circuits are operable for dynamically determining a new said at least one dynamically settable memory allocation priority threshold based on a new application.

23. The system according to claim 22, wherein said monitoring determines a change in a processing data rate for at least one present application.

24. The system according to claim 23, wherein said change in said processing data rate comprises a change in a video frame rate.

25. The system according to claim 23, wherein said data comprises video data.

26. The system according to claim 23, wherein said data comprises audio data.

27. The system according to claim 18, wherein said one or more circuits are operable for dynamically determining a new said at least one dynamically settable memory allocation priority threshold by monitoring at least one software process in at least one present application.

28. The system according to claim 18, wherein said one or more circuits are operable for dynamically determining a new said priority level for said each of said plurality of memory requests in at least one software process in a new application.

29. The system according to claim 18, wherein said one or more circuits are operable for dynamically determining a new said priority level for at least one of said plurality of memory requests in at least one software process by monitoring said at least one software process in at least one present application.

30. The system according to claim 18, wherein said one or more circuits are operable for specifying one of said at least one on-chip memory block and said at least one off-chip memory block from which to said allocate memory.

31. The system according to claim 18, wherein said one or more circuits are operable for moving data in said allocated memory to a different one of said at least one on-chip memory block and said at least one off-chip memory block.

32. The system according to claim 31, wherein said one or more circuits are operable for locking said data to prevent said moving of said data.

33. The system according to claim 31, wherein said one or more circuits are operable for unlocking said data to allow said moving of said data.

34. The system according to claim 33, wherein said data is not accessible to processes when said data is said unlocked, except for said moving of said data.

35. A method for managing memory, the method comprising:
- receiving within a mobile multimedia processor chip a plurality of memory requests;
- handling said plurality of memory requests by allocating memory from one or both of: at least one on-chip memory block and/or at least one off-chip memory block;
- setting a priority level for each of said plurality of memory requests;
- said allocating memory is based on a priority level and at least one dynamically settable memory allocation priority threshold; and
- setting said priority level based on a total number of memory buffers requested.

36. The method according to claim 35, comprising setting said priority level based on an expected number of memory accesses.

37. The method according to claim 35, comprising setting said priority level based on a total number of memory accesses per unit time.

38. The method according to claim 35, comprising placing said off-chip memory block in a power-saving mode.

39. A machine-readable storage having stored thereon, a computer program having at least one code section for managing memory, the at least one code section being executable by a machine for causing the machine to perform steps comprising:
- receiving within a mobile multimedia processor chip a plurality of memory requests;
- handling said plurality of memory requests by allocating memory from one or both of: at least one on-chip memory block and/or at least one off-chip memory block;
- setting a priority level for each of said plurality of memory requests;
- said allocating memory is based on a priority level and at least one dynamically settable memory allocation priority threshold; and
- setting said priority level based on a total number of memory buffers requested.

40. The machine-readable storage according to claim 39, wherein the at least one code section comprises code for setting said priority level based on an expected number of memory accesses.

41. The machine-readable storage according to claim 39, wherein the at least one code section comprises code for setting said priority level based on a total number of memory accesses per unit time.

42. The machine-readable storage according to claim 39, wherein the at least one code section comprises code for placing said off-chip memory block in a power-saving mode.

43. A system for managing memory, the system comprising:
- one or more circuits operable for receiving within a mobile multimedia processor chip a plurality of memory requests;
- said one or more circuits operable for handling said plurality of memory requests by allocating memory from one or both of: at least one on-chip memory block and/or at least one off-chip memory block, wherein said allocating memory is based on a priority level and at least one dynamically settable memory allocation priority threshold;
- said one or more circuits operable for setting a priority level for each of said plurality of memory requests; and
- said one or more circuits are operable for setting said priority level based on a total number of memory buffers requested.

44. The system according to claim 43, wherein said one or more circuits are operable for setting said priority level based on an expected number of memory accesses.

45. The system according to claim 43, wherein said one or more circuits are operable for setting said priority level based on a total number of memory accesses per unit time.

46. The system according to claim 43, wherein said one or more circuits are operable for placing said off-chip memory block in a power-saving mode.

* * * * *